March 23, 1954 M. K. BAKER 2,673,250

DETECTING PICKUP

Filed Feb. 16, 1950 2 Sheets-Sheet 1

INVENTOR:
Max K. Baker,

BY Dawson, Ooms, Booth and Spangenberg
ATTORNEYS.

INVENTOR:
Max K. Baker,
BY Dawson, Ooms, Booth and Spangenberg,
ATTORNEYS.

Patented Mar. 23, 1954

2,673,250

UNITED STATES PATENT OFFICE 2,673,250

DETECTING PICKUP

Max K. Baker, Chicago, Ill.; Edith G. Baker, administratrix of said Max K. Baker, deceased, assignor to Mercury Electronic Laboratories, Inc., a corporation of Illinois Application February 16, 1950, Serial No. 144,499

8 Claims. (Cl. 179—111)

This invention relates to a detecting pickup for use in electronic equipment.

The principal object of this invention is to provide an improved detecting pickup which readily responds to pressure waves including those in the audio, supersonic and radio frequency ranges, which responds readily to the nature of objects adjacent thereto, which responds to movements and variations in the nature of objects adjacent thereto, which responds to electrical fields including those in the audio, supersonic and radio frequency ranges, and which responds to electrical fields set up by radio active substances, wherein all of such responses produce desirable electrical effects.

The detecting pickup of this invention preferably includes a pickup device and an oscillator associated therewith and controlled thereby. The pickup device includes a metallic plate having an oxide coating on one side, a metallic foil for engaging the oxide coating and means such as a rubber jacket for resiliently pressing the metallic foil against the oxide coating. The metallic plate with the oxide coating is preferably provided with a large number of holes so that pressure waves may more readily vibrate the metallic foil with respect to the metallic plate and so that the pickup device may more readily generate external electrical fields. The oscillator may be conventional in construction and may have the pickup device included in the tank circuit thereof for controlling the oscillator.

In the control of the oscillator it is believed that the pickup device acts as a variable capacity and a generator of external electrical fields, the oxide coating acting as a dielectric between the metallic plate and the metallic foil.

Pressure waves, including those in the audio, supersonic and radio frequency ranges, are detected by the pickup device and operate to frequency modulate the oscillator. In this connection it is believed that the pressure waves vibrate the metallic foil with respect to the metallic plate so that the pickup device operates primarily as a variable capacity for frequency modulating the oscillator. The large number of holes in the metallic plate appear greatly to increase the response of the pickup device to the pressure waves. Also, the use of the oxide coating as the dielectric appears further to increase the response of the pickup device to the pressure waves.

The pickup device being located in the tank circuit of the oscillator also operates to generate an electrical field, the holes in the metallic plate providing a relatively intense external field.

When objects are placed within the external field, they affect the field in accordance with their nature. Various objects have different absorption and reflection characteristics and will correspondingly change the absorption and reflection of the generated field. As a result the effective capacity of the pickup device is changed in accordance with the nature of the object and will operate correspondingly to change the frequency of the oscillator. The position of the object in the field will also affect the effective capacity of the pickup device and hence the frequency of the oscillator. If, therefore, the nature of an object in the external field and/or the position thereof in the external field varies from time to time, the effective capacity of the pickup device correspondingly varies and hence frequency modulates the oscillator in accordance with such variations.

The pickup device also responds to electrical fields set up by radio active substances and operates to change the frequency of the oscillator in accordance with such response. It is believed that such fields, including the alpha and beta rays, affect the pickup device to change the capacitative tension thereof and hence the effective capacity thereof. Regardless of the possible theory involved, the detecting pickup of this invention does detect and respond quantitatively to the presence of radio active substances.

Likewise, the pickup device of this invention responds to electrical fields including those in the audio, supersonic and radio frequency ranges and operates to change the frequency of the oscillator in accordance with such response. Here again it is believed that these electrical fields affect the pickup device to change the capacitative tension thereof and hence the effective capacity thereof. Regardless of the possible theory here involved the detecting pickup of this invention does detect and respond quantitatively to the presence of such electrical fields including capacitative and magnetic fields.

It is also found by test and experiment that the various responses of the pickup device of this invention are greatly enhanced by the use of the metallic oxide coating as the dielectric rather than other types of dielectric materials. The reasons for such improved responses are not entirely clear but it is believed that they result from ready electrical alignment of the molecules of the metallic oxide coating in accordance with the electrical fields affecting the same and from a rectifying action afforded by the metallic oxide coating.

In view of the wide variety of conditions to which the detecting pickup and pickup device of this invention respond, it is apparent that they have a wide variety of uses. As for example, they can be used as microphones, in communications applications, in instruments for detecting radio active substances and electrical fields, and in diagnostic instruments.

Further objects of this invention reside in the details of construction of the detecting pickup of this invention and the cooperative relationship between the component parts thereof.

Other objects of this invention will become apparent to those skilled in the art upon reference to the accompanying specification, claims and drawings in which:

Figures 1, 2, 3, 4:
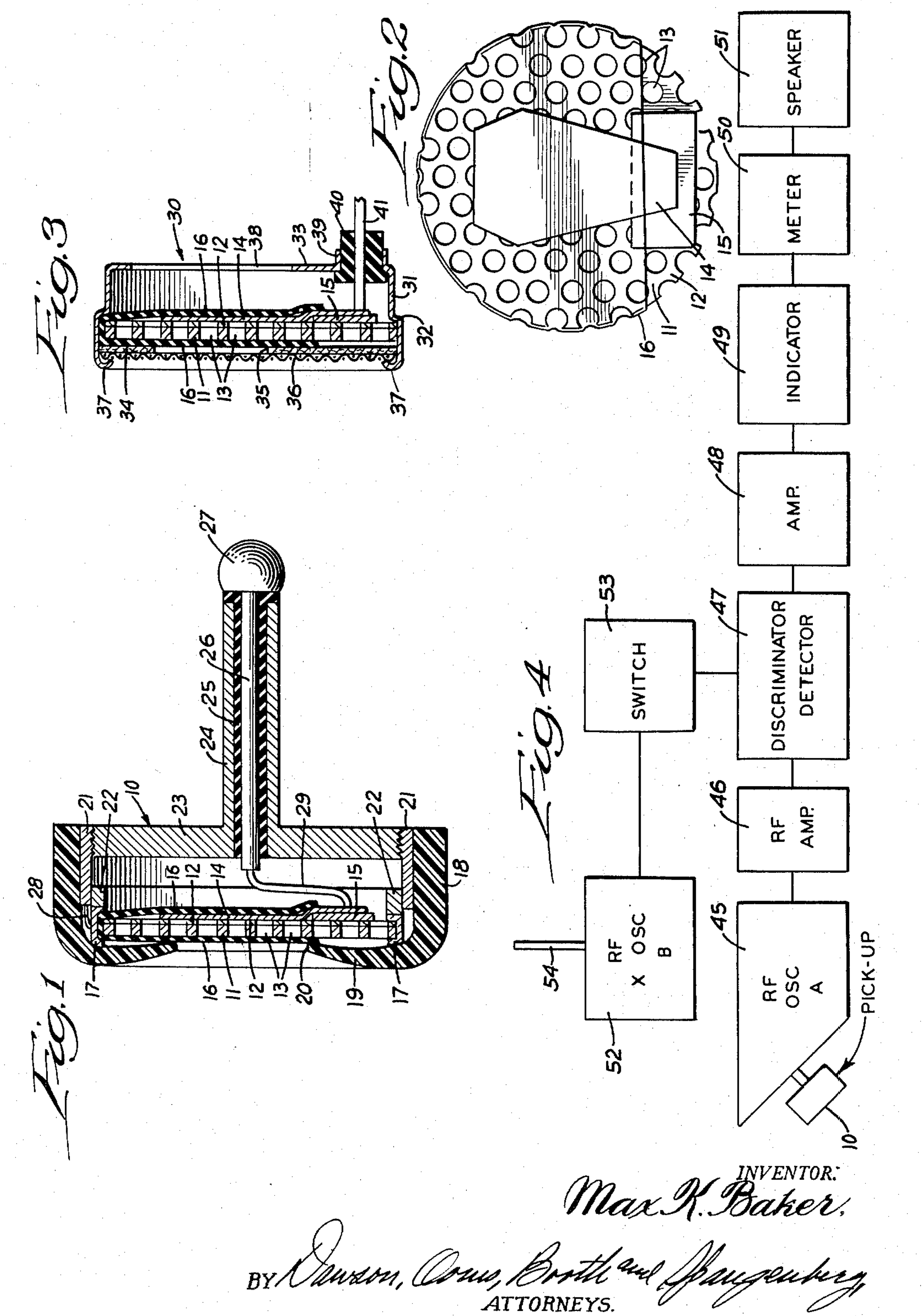
Fig. 1 is a sectional view through one form of the pickup device.
Fig. 2 is an elevational view of the active elements of Fig. 1.
Fig. 3 is a vertical sectional view similar to Fig. 1, but illustrating another form of the pickup device.
Fig. 4 is a block diagram illustrating a diagnostic instrument in which the pickup device of this invention may be utilized.

Referring first to Figs. 1 and 2 the pickup device is generally designated at 10. It includes a metallic plate 11 which has formed on one side thereof a metallic oxide coating 12. For example, the metallic plate may be made of aluminum and may be substantially .025 inch thick. The metallic coating may be aluminum oxide substantially .0002 inch thick. The aluminum oxide may be anodic aluminum oxide formed by anodic oxidation. Of course, other metals than aluminum may be utilized. For example an oxidized titanium plate may be used. The metallic plate and oxide coating are preferably provided with a plurality of holes 13.

A metallic foil 14 overlies and engages the metallic oxide coating 12 and has one end thereof secured to the oxide coating by suitable adhesive 15. The metallic foil is adapted to flex with respect to the metallic oxide coating. For example the metallic foil may be aluminum foil substantially .0001 inch thick but, of course, the foil could be made of other metals. Preferably the foil is made of the same metal as the plate in order to avoid electrolysis.

Means are provided for resiliently engaging the metallic foil 14 with the metallic oxide coating 12 and such means may include a rubber-like jacket 16 which is stretched over and encompasses the metallic plate 11 and the metallic foil 14. This rubber-like jacket may be formed of rubber latex or any other suitable rubber-like material, and since it is stretched it operates in tension for the purpose of resiliently engaging the metallic foil with the metallic oxide coating. For example, latex rubber substantially .001 inch thick in the free state may be stretched to substantially .0005 inch thick for providing the desired tension.

The metallic oxide coating 12 operates as a dielectric so that the metallic plate 11 and metallic foil 14 form a condenser, the capacitance of which may be varied by flexing of the metallic foil. The capacitance of the condenser, of course, is determined by the construction thereof and the construction may be varied in order to obtain desired capacitances for desired uses. In the application of the pickup device to the diagnostic instrument illustrated in Figs. 4 and 5, the condenser preferably has a capacity of substantially twenty-five to fifty M. M. F.

Pressure waves, including those in the audio, supersonic and radio frequency ranges, operate to flex the metallic foil for correspondingly controlling the capacity of the condenser. In this respect the plurality of holes 13 in the metallic plate 11 provide for ready vibration of the metallic foil in response to pressure waves. It is believed also that the metallic foil physically moves in sympathy with alternating electrical fields affecting the same. Of course, instead of providing the plate with the metallic oxide coating, the foil could be provided with such coating for obtaining substantially the same results. The rubber-like jacket, in addition to providing resilient operation of the metallic foil, also effectively operates to protect the assembly from humidity, fumes, dust, dirt and the like.

When the pickup device 10 is located in the tank circuit of an oscillator, the metallic plate 11, the metallic foil 14 and the metallic oxide coating 12 therebetween operate to generate an external electrical field and the intensity of such electrical field is relatively great by reason of the provision of the plurality holes 13. When an object is placed within the generated field, the field is affected in accordance with the density of the object. It is believed that the field is absorbed and reflected in accordance with the density of the object and operates to regulate the effective capacity of the pickup device. This in turn may regulate the frequency of the oscillator.

Experiments show that the pickup device responds to the presence of radioactive substances and to the presence of electrical fields including those in the audio, supersonic and radio frequency ranges. For example, when the pickup device is included in the control or tank circuit of an oscillator, the frequency of the oscillator is varied by the presence of radioactive substances such as radium paint on watch faces and the like. It also responds to concentrated electrical fields produced by external oscillators for regulating the frequency of the associated oscillator. The reasons for such responses are not entirely clear but it is believed that the radioactive substances and electrical fields affect the capacitative tension and hence the effective capacity between the metallic plate 11 and the metallic foil 14. It is also believed they produce varying electrical alignment of the molecules of the metallic oxide coating 12 and that the metallic oxide coating affords a rectifying action. In any event, these responses are present and in an enhanced manner when the metallic oxide coating 12 is used as the dielectric material.

The condenser assembly is preferably provided with a metallic rim 17 spun thereon and in electrical contact therewith. The assembly is adapted to be contained within a housing 18 which in this instance is preferably made of suitable thermoplastic material. The housing 18 is provided with a probing face 19 having a substantially central opening 20 which is in alignment with the metallic foil 14. The plastic housing 18 internally carries a metallic sleeve 21 which in turn frictionally receives a hard fibre washer 22. The fibre washer engages the rim 17 for holding the condenser assembly in place in the housing. Screw-threadedly secured in the metallic sleeve 21 is a metallic disk 23 having an extension 24 forming part of a jack-plug. A central conductor 26 having an external head 27 is received in the extension 24 and is suitably insulated from the extension 24 by insulating material 25. The metallic rim 17 is electrically connected by a conductor 28 to the sleeve 21 and hence to the extension 24. The metallic foil 14 is electrically connected by a conductor 29 to the central conductor 26 and hence to the external head 27. In this way the variable capacitance of the pickup device may be electrically connected to a suitable jack.

In the form of the pickup device illustrated generally at 30 in Fig. 3 the active elements 11 to 16 are substantially the same as those of Fig. 1, and like reference characters have been utilized for like parts. In Fig. 3 there is provided a metallic casing 31 having a shoulder 32 against which the condenser assembly abuts. The casing also has a rear face 33. A protecting disk 34 having an aperture 35 in alignment with the metallic foil 14 overlies the condenser assembly and in turn a wire screen 36 may overlie the disc 34. All of these elements may be secured in place by spinning over the edge of the casing 31 as illustrated at 37. The rear face of the casing 33 may be provided with an opening 38 in alignment with the opening 35. Electrical connection is provided between the metallic plate 11 and the casing 31 by reason of metal to metal contact therebetween. The rear face 33 is punched out to provide an opening therethrough with an extension 39 for receiving an insulating plug 40. The insulating plug centrally carries a resilient contact strip 41 which resiliently engages the metallic foil 14 so that electrical connection with the metallic foil is thereby provided. The pickup device of Fig. 3 is particularly suitable for use in radio and communication applications.

Figure 5:
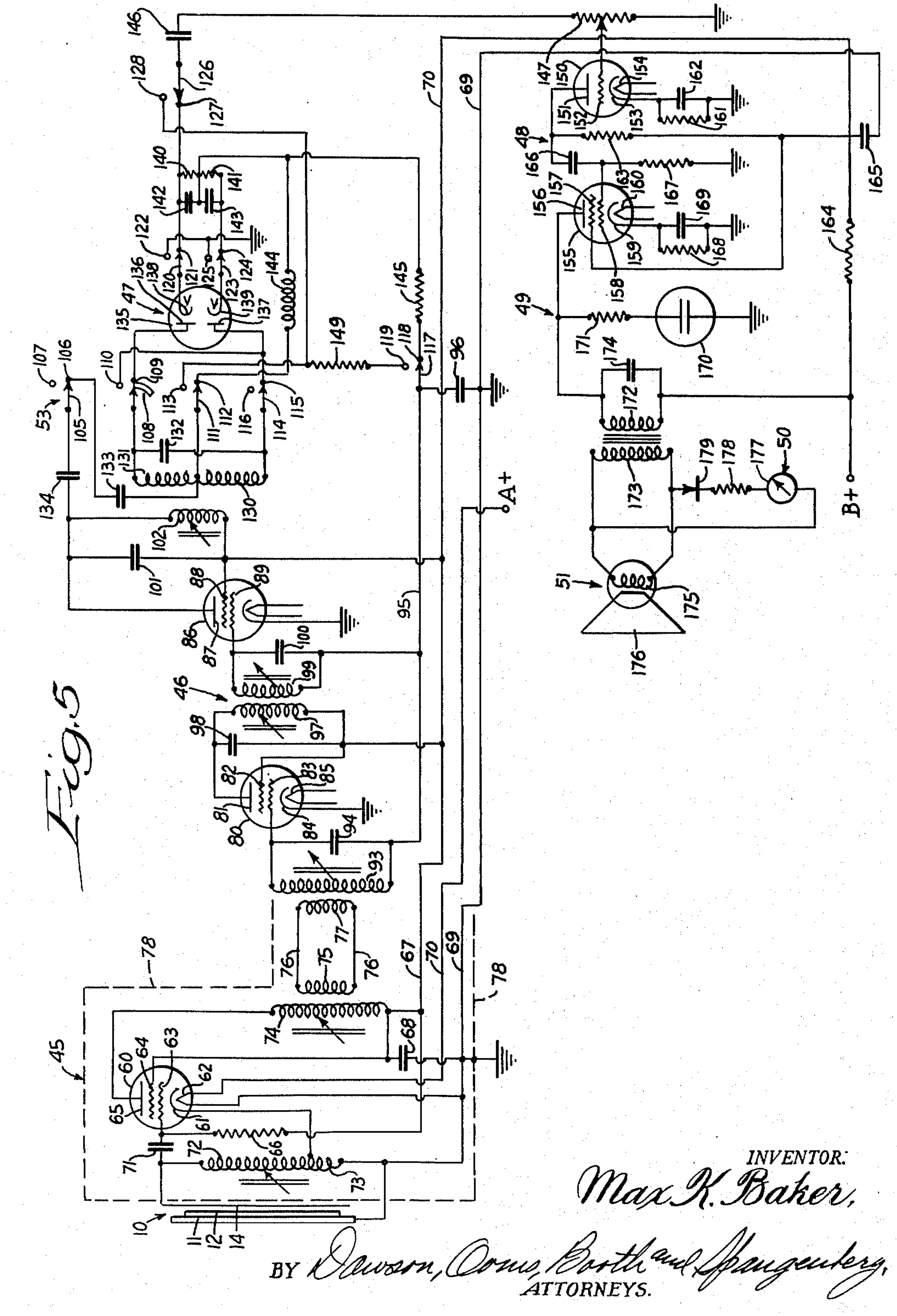
Fig. 5 is a wiring diagram of the diagnostic instrument illustrated in Fig. 4.

For the purpose of illustrating in detail one use of the detecting pickup of this invention, it is illustrated in Figs. 4 and 5 as incorporated in a diagnostic instrument. Referring particularly to Fig. 4, the detecting pickup includes the pickup device 10 and the radio frequency oscillator A designated at 45. The pickup device 10 regulates the frequency of the oscillator 45, the signal from which is amplified by a radio frequency amplifier 46. The amplified signal then passes through a combination discriminator and detector 47 which produces a signal in accordance with the response of the pickup device 10. This latter signal is amplified by an amplifier 48 and in turn operates an indicator 49, a meter 50 and/or a speaker 51. When it is desired that the pickup device 10 should respond to pressure waves such as sounds emanating from the body being diagnosed, the discriminator portion of the combined discriminator and detector 47 is preferably used, and in this connection the pickup device 10 operates primarily to frequency modulate the oscillator 45. The discriminator detects the modulating signal which in turn is amplified and operates the indicator, meter and speaker in accordance therewith. When the diagnostic instrument is utilized for the purpose of diagnosing conditions of body organs, such as the density thereof, then the detector portion of the combination discriminator and detector is preferably used. In this connection the density of the organs being diagnosed operates to change the effective capacity of the pickup device 10 which in turn operates to change the frequency of the oscillator 45. The oscillator 45 beats against a fixed radio frequency oscillator B designated at 52. The fixed frequency oscillator may be a crystal oscillator of conventional construction. The detector portion of the combined discriminator and detector detects the beat frequency, that is the difference between the frequencies of the two oscillators, and this beat frequency is utilized for operating the indicator, meter and speaker. The fixed frequency oscillator may be coupled into the diagnostic instrument at any suitable point ahead of the detector for producing the beat frequency. However, it has been found by test and experiment that much better results are obtained by shielding the fixed frequency osciltaor 52 from the diagnostic instrument and providing the same with an antenna 54 for generating an electrical field which permeates the body being diagnosed. It is believed that the pickup device 10 in addition to being affected by the density of the organis being diagnosed is also affected by the radio frequency electrical fields generated by the fixed oscillator and permeating the organs of the body.

Preferably, a switch 53 is provided for rendering operative and inoperative the fixed frequency oscillator 52 and the discriminator and detector portions of the combination discriminator and detector 47 for adapting the diagnostic instrument for response to pressure waves or organ conditions. Even though the diagnostic instrument is switched so as to respond primarily to organ conditions, it also operates to detect and indicate pressures waves, this being accomplished by side-slope rectification in the detector portion of the combination discriminator and detector 47.

The details of the wiring of the diagnostic instrument are illustrated in Fig. 5, with the pickup device diagrammatically illustrated at 10. The radio frequency oscillator 45 includes an electronic tube 60 having a cathode 61 heated by a filament 62, a control grid 63, a screen grid 64 and a plate 65. The control grid 63 is connected through a resistance 66 and a conductor 67 to the source of a B+ potential, although it may equally as well be connected to ground. The screen grid 64 is connected through a condenser 68 to a ground conductor 69. One side of the filament 62 is connected to the ground conductor 69 and the other side to a conductor 70 connected to A+ potential. The control grid 63 is connected through a condenser 71 to a control or tank circuit which includes the capacitance of the pickup device 10 and also a pair of variable inductances 72 and 73. The cathode 61 is connected to the junction of the inductances 72 and 73. The plate 65 is connected through a variable inductance 74 to the B+ supply conductor 69 and through the condenser 68 to ground. By suitably varying the inductance of the inductances 72 and 73 the frequency of oscillation of the oscillator 45 may be regulated. This may be accomplished by positioning a powdered iron core with respect to the inductances. For example, the frequency of the oscillator 45 may be regulated through a frequency range extending from 1945 to 2145 kc. and the fixed oscillator is tuned to substantially 2045 kc. Of course, other values of frequency and range of frequencies may be utilized.

Pressure waves, including those in the audio, supersonic and radio frequency ranges, which operate to flex the metallic foil 13 correspondingly vary the capacity of the pickup devices. This in turn correspondingly varies the frequency of the oscillator and hence the oscillator is frequency modulated in response to such pressure waves. Since the pickup device is included in the control or tank circuit of the oscillator it generates an external electrical field, so that when the probing face of the pickup device is placed against the body, the generated electrical field is absorbed and reflected in accordance with the density of the body at that point. This in turn operates to regulate the effective capacity of the pickup device in accordance with the density. Thus the pickup device operates to regulate the frequency of the oscillator in accordance with the density. The plurality of holes in the metallic plate 11 assist in the generating of a relatively intense external electrical field and this external electrical field is largely directed into the body by the opening 20 in the probing face of the pickup device.

The output of the oscillator 45 is transmitted through a link circuit including an inductance 75 associated with the inductance 74 and connected by a pair of conductors 76 to an inductance 77. Preferably, the oscillator 45 and pickup device 10 are located remotely from the rest of the instrument and connected thereto by a suitable cable including the conductors 67, 69, 70 and 76. The oscillator 45 is preferably included in a suitable small casing which may be readily manually manipulated, and this casing and cable are shielded by a grounded shield indicated at 78.

The radio frequency amplifier 46 may include a first stage having an electronic tube 80 provided with a plate 81, a screen grid 82, a control grid 83, a cathode 84 and a filament 85 and also a second stage having an electronic tube 86 provided with a plate 87, a screen grid 88, a control grid 89, a cathode 90 and a filament 91. The inductance 77 of the link circuit is inductively coupled to a variable inductance 93 having a condenser 94 connected thereacross. The inductance 93 is connected to the control grid 83 and to a conductor 95 which in turn communicates with ground through a condenser 96. The cathode 84 is connected to ground. The plate 81 is connected to one end of a variable inductance 97 across which is connected a condenser 98. The other end of the variable inductance 97 and the screen grid 82 are connected to the conductor 70 leading from the B+ potential. Inductively coupled with the variable inductance 97 is another variable inductance 99 which has a condenser 100 connected thereacross. The variable inductance 99 is connected to the control grid 89 and to the conductor 95. The cathode 90 is connected to ground. The plate 87 is connected to a variable inductance 102 having a condenser 101 connected thereacross and the variable inductance 102 and the screen grid 88 are connected to the conductor 70. Thus two stages of radio frequency amplification are provided.

The switch 53 for rendering operative and inoperative the discriminator portion and the detector portion of the combined discriminator and detector 47 is illustrated as a two position switch having a switch arm 105 for engaging contacts 106 and 107, an overlapping switch arm 108 for engaging contact 109 and for engaging contacts 109 and 110, a switch arm 111 for engaging contacts 112 and 113, a switch arm 114 for engaging contacts 115 and 116, a switch arm 117 for engaging contacts 118 and 119, a switch arm 120 for engaging contacts 121 and 122, a switch arm 123 for engaging contacts 124 and 125 and a switch arm 126 for engaging contacts 127 and 128. When the switch is in the lower position illustrated, the discriminator portion is operative and when in the upper position, the detector portion is operative.

The combined discriminator and detector 47 will first be described as a discriminator. It includes a pair of serially arranged inductances 130 and 131 inductively coupled to the variable inductance 102. A condenser 132 is connected across the inductances 130 and 131. The junction of the inductances 130 and 131 is connected through a condenser 133, contact 106, switch arm 105 and condenser 134 to the plate 87 of the radio frequency amplifier. One end of the inductance 131 is connected through switch arm 108 and contact 109 to one plate 136 of a double diode electronic tube 135. One end of the inductance 130 is likewise connected through the switch arm 114 and contact 115 to the other plate 137 of the diode electronic tube. The diode tube includes cathodes 138 and 139 associated with the plates 136 and 137. The cathode 138 is connected through switch arm 120 and contact 121, serially arranged resistances 140 and 141 and contact 124 and switch arm 123 to the cathode 139. Condensers 142 and 143 are connected across the resistances 140 and 141. The juncture of the resistances 140 and 141 is connected through a radio frequency choke 144 and contact 112 and switch arm 111 to the juncture of the inductances 130 and 131. The juncture of the resistances 140 and 141 is also connected through a resistance 145, contact 118 and switch arm 117 to the conductor 95 which communicates with ground through the condenser 96. The resistance 140 is connected through contact 127, switch arm 126 and a condenser 146 to one end of a volume control potentiometer 147, the other end of which is connected to ground. The discriminator portion is, therefore, conventional in construction and operation and operates to produce a signal corresponding to the modulation of the oscillator 45 by the pickup device 10.

When the switch 53 is moved to the other position, the combined discriminator and detector operates as a detector. The switch 105 breaks the capacitative connection to the inductance 131. The switch 114 breaks the connection to the inductance 130. The switch 108 connects the upper end of the inductance 131 to the plates 136 and 137 in parallel. The switch 111 breaks the connection to the radio frequency choke and connects the lower end of the inductance 131 to contact 128. The switch 117 breaks the connection to resistance 145 and connects the lower end of the inductance 131 through resistance 149 to the conductor 95 which in turn communicates with ground through the condenser 96. The switches 120 and 123 connect the cathodes 138 and 139 in parallel to ground. Thus the inductances 102 and 131 and the diode tube 135 operate as a conventional detector for detecting the difference in frequencies between the oscillator 45 controlled by the pickup device and the fixed frequency oscillator 52 for producing a signal in accordance with such differences which is transmitted through the condenser 146 to the volume control potentiometer 147.

The audio amplifier 48 preferably has two stages of amplification. The first stage includes an electronic tube 150 having a plate 151, a control grid 152, a cathode 153 and a filament 154. The second stage includes an electronic tube 155 having a plate 156, a screen grid 157, a control grid 158, a cathode 159 and a filament 160. The cathode 153 of the first stage is connected to ground through a grid leak bias consisting of a resistance 161 and a condenser 162. The control grid 152 is connected to the volume control potentiometer 147. The plate 151 is connected through a resistance 163 to the conductor 70 leading from the source of B+ potential and is also connected through a condenser 166 to the control grid 158 of the second stage. The control grid 158 is connected to ground through resistance 167. The cathode 159 is connected to ground through a grid leak bias consisting of a resistance 168 and a condenser 169. The screen grid 157 is connected to the conductor 70. The plate circuit of the second stage of amplification controls the indicator 49, the meter 50 and the speaker 51.

The indicator 49 may include a lamp such as a neon lamp 170. The lamp 170 is connected to ground and through a resistance 171 to the plate 156. The plate 156 is also connected to the primary 172 of a transformer having a condenser 174 connected in parallel therewith. The primary 172 is connected to the source of B+ potential. The secondary 173 of the transformer is connected to the operating coil 175 for operating the speaker element 176 of the speaker 51. The indicator 49 may be a milliameter 177 connected across the secondary 173 through a resistance 178 and a rectifier 179. The conductor 70 is connected through a resistance 164 to the source of B+ potential and through a condenser 165 to ground.

When the switch 53 is in the upper position and the fixed oscillator 52 is made operative the pickup device 10 is utilized primarily for responding to the density of organs adjacent thereto. The frequency of the oscillator 45 is regulated in accordance with the response of the pickup device 10 to the organ density. And the oscillator 45 beats against the fixed oscillator 52. The beat frequency is detected by the detector portion of the combination discriminator and detector 47 for producing a signal for operating the indicator, meter and speaker in accordance with the beat frequency. Thus the speaker will have a characteristic tone for each density measured by the pickup device. By moving the pickup device along the body, tone changes will occur as the pickup device is moved over the edge of an organ. In this way, by listening to the tone changes the contour of the body organ may be readily determined. By the character of the tone the density of the organ and of portions of the organ may also be determined.

The audio amplifier 48 is so arranged that an increase in beat frequency causes a decrease in the output voltage thereof. Since the indicator 49 and the meter 50 are operated in accordance with the output voltage of the audio amplifier, they will provide visual indications of the beat frequency and hence of the density of the body organ being diagnosed.

Pressure waves affecting the pickup device operate to frequency modulate the oscillator 45 in accordance with those pressure waves and due to the nature of the detector the modulating frequency is also detected by means of side slope rectification. This modulating frequency caused by pressure waves is audibly indicated by the speaker 51 and visually indicated by the indicator 49 and the meter 50.

The condenser 96 located between the conductor 95 and ground provides for maximum recovery rate in the electronic apparatus so that the electronic apparatus responds rapidly to changes in conditions affecting the pickup device.

When the swtich 53 is moved to the lower position to render operative the discriminator portion of the combined discriminator and detector 47, and the fixed oscillator 52 is rendered inoperative, then the pickup device 10 responds primarily to pressure waves. Under these conditions the pressure waves affecting the pickup device 10 operate to frequency modulate the oscillator 45. The discriminator produces a signal in accordance with the modulating frequency for operating the speaker 51 and the indicator 49 and meter 50 for audibly and visually indicating the pressure waves affecting the pickup device.

The pickup device 10 and the detecting pickup, consisting of the pickup device 10 and the radio frequency oscillator 45, have many uses and applications other than in the diagnostic instrument described above. For example, they may be used as microphones in radio and communication applications and in instruments for detecting electrical fields and radioactive substances such as "Geiger" counters and the like.

While for purposes of illustration two forms of this invention have been disclosed, other forms thereof may become apparent to those skilled in the art upon reference to this disclosure, and, therefore, this invention is to be limited only by the scope of the appended claims.

What is claimed is:

1. A pickup device comprising a metallic plate, a metallic oxide coating on one side of the plate, a sheet of metallic foil for engaging the metallic oxide coating, and means for resiliently pressing the metallic foil against the metallic oxide coating.

2. A pickup device comprising a metallic plate having a plurality of holes therethrough, a metallic oxide coating on one side of the plate, a sheet of metallic foil for engaging the metallic oxide coating, and means for resiliently pressing the metallic foil against the metallic oxide coating.

3. A pickup device comprising a metallic plate, a metallic oxide coating on one side of the plate, a sheet of metallic foil for engaging the metallic oxide coating, and a rubber-like jacket encompassing in tension the metallic plate and the metallic foil for resiliently pressing the metallic foil against the metallic oxide coating.

4. A pickup device comprising a metallic plate having a plurality of holes therethrough, a metallic oxide coating on one side of the plate, a sheet of metallic foil for engaging the metallic oxide coating, and a rubber-like jacket encompassing in tension the metallic plate and the metallic foil for resiliently pressing the metallic foil against the metallic oxide coating.

5. A pickup device comprising an aluminum plate, an anodic aluminum oxide coating on one side of the plate, a sheet of aluminum foil for engaging the oxide coating, and means for resiliently pressing the aluminum foil against the oxide coating.

6. A pickup device comprising an aluminum plate, an anodic aluminum oxide coating on one side of the plate, a sheet of aluminum foil for engaging the oxide coating, and a rubber-like jacket encompassing in tension the aluminum plate and the aluminum foil for resiliently pressing the aluminum foil against the oxide coating.

7. A pickup device comprising a metallic plate, a metallic oxide coating on one side of the plate, a sheet of metallic foil of smaller dimension than the metallic plate for engaging the metallic oxide coating, means for resiliently pressing the metallic foil against the metallic oxide coating, and a casing supporting and enclosing the metallic plate and metallic foil and provided with an opening in alignment with the metallic foil.

8. A pickup device comprising a metallic plate having a plurality of holes therethrough, a metallic oxide coating on one side of the plate, a sheet of metallic foil of smaller dimension than the metallic plate for engaging the metallic oxide coating, means for resiliently pressing the metallic foil against the metallic oxide coating, and a casing supporting and enclosing the metallic plate and metallic foil and provided adjacent the metallic plate with an opening in alignment with the metallic foil.

MAX K. BAKER.

References Cited in the file of this patent

UNITED STATES PATENTS

| Number | Name | Date |
|---|---|---|
| 1,584,613 | Comstock | May 11, 1926 |
| 1,811,067 | Walle | June 23, 1931 |
| 2,130,946 | Bruno | Sept. 20, 1938 |
| 2,174,840 | Robinson | Oct. 3, 1939 |
| 2,321,370 | Dubilier | June 8, 1943 |
| 2,410,982 | Koch | Nov. 12, 1946 |
| 2,445,821 | Brewer | July 27, 1948 |

FOREIGN PATENTS

| Number | Country | Date |
|---|---|---|
| 411,619 | Great Britain | June 14, 1934 |
| 439,081 | Great Britain | Nov. 28, 1935 |